(12) United States Patent
Hereford et al.

(10) Patent No.: US 7,716,074 B2
(45) Date of Patent: May 11, 2010

(54) METHOD AND SYSTEM FOR INSURING CLUB MEMBERSHIP FEES

(76) Inventors: Fonda A. Hereford, 59 Clermont La., St. Louis, MO (US) 63124; Stephen J. Hall, 18 S. McKnight Rd., St. Louis, MO (US) 63124

( * ) Notice: Subject to any disclaimer, the term of this patent is extended or adjusted under 35 U.S.C. 154(b) by 1375 days.

(21) Appl. No.: 10/463,125

(22) Filed: Jun. 17, 2003

(65) Prior Publication Data

US 2004/0078249 A1    Apr. 22, 2004

Related U.S. Application Data

(63) Continuation-in-part of application No. 09/798,182, filed on Mar. 2, 2001, now Pat. No. 7,395,218.

(51) Int. Cl.
*G06Q 40/00* (2006.01)
(52) U.S. Cl. .............................. 705/4; 705/35
(58) Field of Classification Search ................ 705/4
See application file for complete search history.

(56) References Cited

U.S. PATENT DOCUMENTS

| | | | |
|---|---|---|---|
| 4,633,397 A | 12/1986 | Macco | |
| 5,495,695 A | 3/1996 | Elliott, Jr. | |
| 5,630,073 A | 5/1997 | Nolan | |
| 5,645,279 A | 7/1997 | Reutlinger | |
| 5,755,621 A | 5/1998 | Marks et al. | |
| 5,778,608 A | 7/1998 | Elliott, Jr. | |
| 5,956,687 A | 9/1999 | Wamsley et al. | |
| 5,970,470 A | 10/1999 | Walker et al. | |
| 5,970,476 A | 10/1999 | Fahey | |
| 6,029,144 A | 2/2000 | Barrett et al. | |
| 6,064,986 A | 5/2000 | Edelman | |
| 6,093,100 A | 7/2000 | Singer et al. | |
| 6,113,493 A * | 9/2000 | Walker et al. | 463/25 |
| 6,162,459 A | 12/2000 | Hu | |
| 6,233,566 B1 | 5/2001 | Levine et al. | |
| 6,347,302 B1 * | 2/2002 | Joao | 705/36 R |
| 6,351,738 B1 | 2/2002 | Clark | |
| 6,463,419 B1 | 10/2002 | Kluss | |
| 6,470,338 B1 | 10/2002 | Rizzo et al. | |
| 6,526,393 B1 | 2/2003 | Fredman | |
| 7,082,409 B1 * | 7/2006 | Cherry | 705/26 |
| 2003/0018558 A1 | 1/2003 | Heffner et al. | |
| 2004/0117214 A1 * | 6/2004 | Shea | 705/2 |

OTHER PUBLICATIONS

Clapp, Jr., Wallace "Insurers Carve Niche for Golf Course Programs," Jun. 1994, Rough Notes, vol. 137, No. 6, p. 30 (5 pages).*

* cited by examiner

*Primary Examiner*—Robert W Morgan
*Assistant Examiner*—Rachel L Porter
(74) *Attorney, Agent, or Firm*—Armstrong Teasdale LLP

(57) ABSTRACT

A method for insuring initiation fees includes receiving information pertaining to an entity and a member, receiving information pertaining to the initiation fee, and processing the received information to determine whether to approve an insurance benefit for the initiation fee of the member. A system for implementing an insurance program for club initiation fees includes at least one user device and a server connected to the user device. The server is configured to receive, via the at least one user device, information pertaining to an initiation fee insurance program. The server is also configured to process the received information and transmit information to the user device regarding whether the initiation fee insurance application has been accepted or rejected.

17 Claims, 22 Drawing Sheets

| | Named Insured Detail | Named Insured Contact Detail | Insured Club Detail | Insured Club Contact Detail | Enrollee Detail | Application Forms | Benefit Forms | Financial Transactions | Security Assignment |
|---|---|---|---|---|---|---|---|---|---|
| Insurance Broker Administrator | X | X | X | X | X | X | X | | X |
| INSURER Administrator | X | X | X | X | X | X | X | | |
| Account Manager | X | X | X | X | X | | | | |
| Named Insured Contact | | | | | X | X | X | X | X |
| Insured Club Contact | | | | | X | X | X | X | |
| Benefits Administrator | X | X | X | X | X | X | X | | |
| Financial Administrator | X | X | X | X | X | X | X | X | |

Applications
O&M Services

Named Insured Application

Please fill in the following application form
To submit a new named insured.

Named Insured*
Mailing Addr*
State*        SELECT
Location Addr
State         SELECT
Contact Person                                City*
Main Phone #                                  Zip*
Email Address*                                City    Phone #
Years in Business                             Zip     FAX #*

Type of Club           Number of Each Club    Total Membership    Average Age of Member
SELECT                                 New 212 (bracket on right side)
214 (New button)
210 (page indicator)

Applications | Claims | Profiles | Reports | O & M | Home | Log Off

FIG. 9

Insured Club Application

Please fill in the following application form to submit a new insured club.

*Applications*
*O&M Services*

| | | | |
|---|---|---|---|
| Insured Club* | [____] | | |
| Named Insured* | [SELECT ▾] | | |
| Mailing Addr* | [____] | City* | [____] |
| State* | [SELECT ▾] | Zip* | [____] |
| Location Addr (If different) | [____] | City | [____] |
| State | [SELECT ▾] | Zip | [____] |
| General Manager Name* | [____] | GM's Phone #* | [____] |
| Contact Person (If different) | [____] | Contact's Phone | [____] |
| Main Phone #* | [____] | FAX # | [____] |
| Invoice Email* | [____] | Allow Installments* | ○ Yes ⦿ No |
| Years in Business* | [____] | Last 3 Years Attrition Rate | [0%] |

Membership Category [____]

Initiation Fee [0]

[New] — 224

Applications | Claims | Profiles | Reports | O&M | Home | Log Off 220
222

Claims
O&M Services

New Claim Application

Please fill in the following application form to submit a new claim.

| | |
|---|---|
| Select Club Member | 00111 john q public ▼ |
| Club Name & ID | Test Club2 00010 |
| Member Name | john q public |
| Original Addr | 59 clermont lane<br>st louis, FL 63124 |
| Original Phone Number | (314) 994-9636 |
| Original Initiation Fee | $5,000.00 |
| Club Enrollment Date | 11/21/2002 |
| New Addr* | [ ] City* [ ] |
| State* | SELECT ▼  ZIP* [ ] |
| New Phone Number* | [ ] |
| Move Date* | [ ] |
| Miles Moved | [ ] |
| Claim Date* | 5/28/2003 |
| Resignation Date* | [ ] |

FIG. 14

Claims
O&M Services

Outstanding Claims

| Payable To | Member | Claim Amount | Claim Initiated | Claim Submitted | Resignation Submitted | Affidavit Submitted | Accepted | Rejected | Processed Date |
|---|---|---|---|---|---|---|---|---|---|
| Test Insured Club and Named Insured | Test Member 2 | 8380 | 3/6/2002 | ☑ | ☐ | ☐ | ☐ | ☐ | |
| Test Insured Club and Named Insured | Test Member 3 | 2565 | 3/6/2002 | ☑ | ☐ | ☐ | ☐ | ☐ | |

[Update] [Reset]

Applications | Claims | Profiles | Reports | O & M | Home | Log Off

FIG. 15

Profiles
O&M Services

Named Insured Profile

| Field | Value | Field | Value |
|---|---|---|---|
| Select Named Insured To Update | 00010 Test Club2 | | |
| Named Insured* | Test Club2 | Policy Number* | test1 |
| Mailing Addr* | test drive | City* | i don't care |
| State* | Nebraska | Zip* | 11109 |
| Location Addr | SELECT | City | |
| State | | Zip | |
| Contact Person | | Phone # | (908) 555-1212 |
| Main Phone # | (908) 555-1212 | FAX # | |
| Email Address* | skurzawski@chubb.com | Insured By | Chubb |
| Status* | Active | ACH Number | |
| Years in Business | 10 | | |

— 282

| Type of Club | Number of Each Club | Total Membership | Average Age of Member |
|---|---|---|---|
| | | 35000 | 48 |

| Country | SELECT |
|---|---|

Delete — 285
New — 284
— 286

Comment

Applications | Claims | Profiles | Reports | O&M | Home | Log Off

FIG. 16

Profiles

Named Insured Contact

Select Named Insured Contact to Update [New ▼] Or press New to add a new Contact [New] ← 294

Named Insured* [00010 Test Club2 ▼]
Name* [ ]
Phone # [ ]
Extension [ ]
Email* [ ]
Pager # [ ]
Cell Phone # [ ]
User Id* [ ]                      Password* [ ]
Role [Named Insured Contact ▼]
Status [SELECT ▼]
Account Manager [Administrative User ▼]

⎫
⎬ 292
⎭

[◀ ▶] ← 298

Applications | Claims | Profiles | Reports | O&M | Home | Log Off

FIG. 17

Profiles

*O&M Services*

Insured Club Profile

| Select Insured Club to Update | 00010 Test Club2 | | | | | | | | | |
|---|---|---|---|---|---|---|---|---|---|---|
| Insured Club* | Test Club2 | | | | | Ownership* | | | Member Owned | |
| Named Insured* | 00010 Test Club2 | | | | | Type of Club* | | | Country | |
| Policy Number* | test1 | | | | | Status | | | Active | |
| Policy Inception Date* | 3/1/2002 | | | | | Claims Paid To Date | | | $0.00 | |
| Deposit Premium* | $15,000.00 | | | | | Remaining Deposit | | | $0.00 | |
| Mailing Addr* | test drive | | | | | City* | | | i don't care | |
| State* | Nebraska | | | | | Zip* | | | 11109 | |
| Location Addr (if different) | | | | | | City | | | | |
| State | SELECT | | | | | Zip | | | | |
| General Manager Name* | Tom Von Bokel | | | | | GM's Phone #* | | | (908) 555-1212 | |
| Contact Person (if different) | | | | | | Contact's Phone | | | | |
| Main Phone #* | (908) 555-1212 | | | | | FAX # | | | (908) 555-1212 | |
| Invoice Email* | tom.vonbokel@mavtech.c | | | | | Allow Installments* | | | ⦿Yes ○No | |
| Years in Business* | 10 | | | | | Last 3 Years Attrition Rate | | | 10% | |
| ACH Number | | | | | | Insured By | | | Chubb | |
| Producer* | Owners & Members National Insurance Services, LLC | | | | | Producer Commission %* | | | 15% | |
| Sub-Producer | SELECT | | | | | Sub-Producer Commission % | | | 0% | |

% of Original Initiation Fee Refunded

| Membership Category | Initiation Fee | Insurance Rate | Yr 1 | Yr 2 | Yr 3 | Yr 4 | Yr 5 | Yr 6 | Yr 7 | Yr 8 | Yr 9 | Yr 10 |
|---|---|---|---|---|---|---|---|---|---|---|---|---|
| Associate | 5000 | 16.1% | 0 | 100 | 100 | 100 | 100 | 0 | 0 | 0 | 0 | 0 |
| Existing Mem | 10000 | 12.4% | 0 | 80 | 70 | 60 | 50 | 0 | 0 | 0 | 0 | 0 |
| Test | 9000 | 13.2% | 0 | 100 | 100 | 100 | 75 | 75 | 75 | 75 | 75 | 0 |
| | | 0% | 0 | 80 | 70 | 60 | 50 | 0 | 0 | 0 | 0 | 0 |

Comment

Applications | Claims | Profiles | Reports | O & M | Home | Log Off

FIG. 18

*Profiles*
*O&M Services*

Insured Club Contact

Select Insured Club Contact to Update [Jackie Kennedy ▽]   Or press New to add a new Contact [New]—324

Insured Club ID* [00015 WHCC, LLC]
Name* [Jackie Kennedy]
Phone #* [(954) 384-4608]
Extension [ ]
Email* [jKennedy@heritagegolfgr]
Pager # [ ]
Cell Phone # [ ]
User Id* [jackie001]       Password* [ ]
Role [Insured Club Contact ▽]
Status [Inactive ▽]
Account Manager [Fonda Hereford ▽]

[Jackie is Director of Membership.
Jackie has been relocated - made her in active. 3/19/03]

[◁ ▷]—328

Applications | Claims | Profiles | Reports | O & M | Home | Log Off

Benefits Submitted

| Date Submitted | Enrollee ID | Policy Number | Benefit Issued | Enrollee | Select |
|---|---|---|---|---|---|
| 02/16/03 | 101-00001-00250 | 1234567-9876 | 04/16/03 | Billy Jones | ☐ |
| 03/21/03 | 101-00050-00921 | 9876543-1234 | Rejected | Jim Baker | ☑ |
| 06/17/03 | 103-00007-00019 | 8642097-5318 | 08/17/03 | Charles Coats | ☐ |

Select Benefit application and submit for further detail

[Submit]

US 7,716,074 B2

METHOD AND SYSTEM FOR INSURING CLUB MEMBERSHIP FEES

CROSS REFERENCE TO RELATED APPLICATIONS

This application is a continuation-in-part of U.S. patent application Ser. No. 09/798,182, filed Mar. 2, 2001 now U.S. Pat. No. 7,395,218 which is hereby incorporated by reference in its entirety.

BACKGROUND OF THE INVENTION

This invention relates generally to insurance programs and, more particularly, to methods and systems for insuring membership fees, dues and assessments.

Many people desire to find a comfortable location to enjoy a relaxed life-style while having access to multiple amenities. In addition, many families enjoy spending time with people that have similar life styles, hobbies, and preferences. In addition, some people enjoy a certain activity so much, that they prefer to join a club to have access to such activities on a frequent basis.

Generally, in order to join such clubs, a person or family pays an initiation fee and annual or monthly dues. While the initiation fees are important to the club since they are used primarily for capital expenditure (golf course improvements, swimming pool, club house), the dues are used for operations such as salaries, restaurant and bar operations, daily maintenance and retail opportunities. Many clubs have one of two types of refundable initiation fee programs. The first type of program is for equity clubs where, once a requisite number of memberships to the club has been sold, a refund is paid to the resigned member, in the order of resignation, as each new membership is sold. Typically the amount paid is a percentage of the then current initiation fee. The resigning member is typically required to continue paying the monthly dues until the resigning member is replaced by a new member. The second type of program is for initiation deposit program clubs where the initiation fee is a deposit, i.e., a tax-free, no interest loan from the member. For a resigned member to recover the initiation deposit, the club membership must be full. The resigning member will then be repaid when a new member joins based on the resigning member's place on the resigned member list. Alternatively, if the club never achieves full membership, the resigning member is repaid no later than 30 years from the date the membership was first sold. Members are also sometimes asked to pay one-time assessments. An assessment differs from an initiation fee or dues payment in that an assessment is a special, and sometimes unexpected, one-time payment to the club by the members.

Prospective members are typically concerned that if they must leave a club for an unforeseen reason, they will not have the ability to retrieve all or a portion of the initiation fees, dues and assessments. This potential lack of prompt payback of the initiation fee is a deterrent to new people joining clubs. It is therefore desirable to enable a club member to obtain at least a portion of their payments to a club upon resigning from the club. In addition, it would be desirable if the club were reimbursed for the loss of such payments (i.e. initiation fees, dues, and assessments) in a reasonable amount of time to enable the reimbursement of these payments to the resigning member in a reasonable amount of time after their departure. It is still further desirable to allow members to finance all or part of the initiation fees, dues, and assessments.

BRIEF DESCRIPTION OF THE INVENTION

In an exemplary embodiment of the invention, a method for insuring initiation fees includes receiving information pertaining to an entity and a member, receiving information pertaining to the initiation fee, and processing the received information to determine whether to approve an insurance benefit for the initiation fee of the member. A system utilized to implement an insurance program for insuring initiation fees includes at least one user device and a server connected to the user device. The server is configured to receive, via the at least one user device, information pertaining to an initiation fee insurance program. The server is also configured to process the received information and transmit information to the user device regarding whether the initiation fee insurance application has been accepted or rejected. Member dues and assessments are also insurable utilizing the above described methods and systems. The methods and systems also incorporate provisions which allow members to finance their initiation fees, dues, and assessments.

BRIEF DESCRIPTION OF THE DRAWINGS

FIG. 6 is a matrix detailing the access the business entities shown in FIG. 5 have to various pages of the web site;

FIG. 8 is an exemplary embodiment of an insurance broker web site login page;

FIG. 9 is an exemplary embodiment of a named insured application page;

FIG. 10 is an exemplary embodiment of a club application page;

FIG. 13 is an exemplary embodiment of an electronic fund transfer page;

FIG. 14 is an exemplary embodiment of a claim application page;

FIG. 15 is an exemplary embodiment of an outstanding claims page;

FIG. 16 is an exemplary embodiment of a named insured profile page;

FIG. 17 is an exemplary embodiment of a named insured contact profile page;

FIG. 18 is an exemplary embodiment of an insured club profile page;

FIG. 19 is an exemplary embodiment of an insured club contact profile page;

FIG. 21 is an exemplary embodiment of a benefits submitted page; and

DETAILED DESCRIPTION OF THE INVENTION

Figure 1:
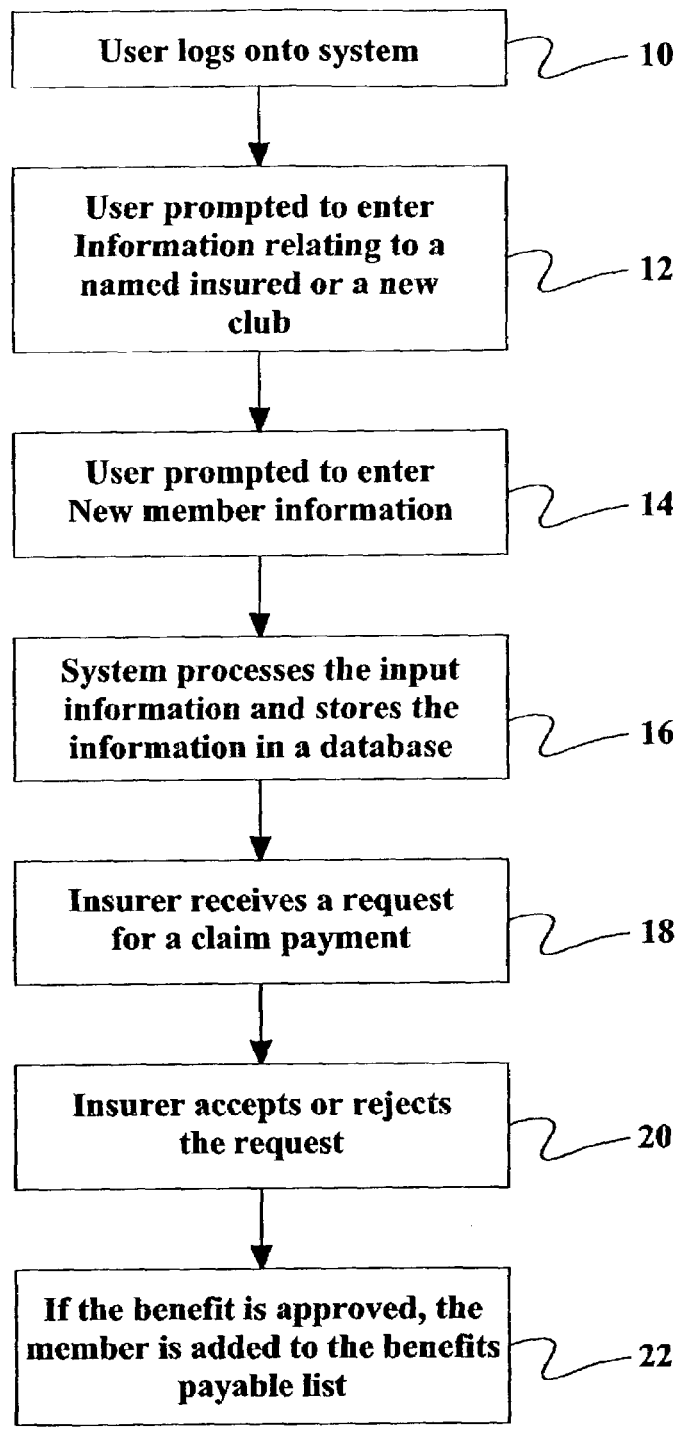
FIG. 1 is a flow chart illustrating process steps for providing insurance for club membership fees in accordance with one embodiment of the present invention.

Set forth below is a description of exemplary methods and systems for providing insurance for club membership fees, including, but not limited to, initiation fees, periodic dues, and assessments. While the methods and systems are sometimes described in the context of private clubs, the methods and systems are not limited to practice in connection with only private clubs. Rather, the methods and systems are applicable to any club or club type service organization that charges any one or more of initiation fees, periodic dues, and assessments. Alternative embodiments of the above described systems allow a club member to finance one or more of their initiation fees, dues, and assessments, in addition to the financing of the insurance premiums for their initiation fees, dues, and assessment insurance.

In an exemplary embodiment of the invention, an insurance policy between a club and an insurance provider pays a benefit to the club to cover a loss of an initiation fee for a private club member due to the member resigning from the club for one of a selected number of reasons, such as geographical relocation. In an alternative embodiment, an insurance policy between a club and an insurance provider benefits a club member for loss of initiation fees, dues, or assessments due to the death or disability of the member. In one embodiment, a geographical relocation is defined as a change from a current residence to another residence more than 150 miles from the original residence. Alternatively, the move may be more or less than 150 miles. Geographical relocation is one of two types, either employment related (termed peril) or any type of move (all-risk).

In an exemplary scenario, a member joins a club on Apr. 1, 2001 and the club has already taken out an insurance policy on all member initiation fees. There is a one year waiting period, during which time the club is not entitled to receive initiation fee insurance benefits for their resigning members. Although insurance coverage of the club begins on Apr. 1, 2001, the policy cannot be triggered until Apr. 1, 2002. Thus benefits are not payable unless the member resigns more than one year after joining the club. After that time, the club receives a settlement from the insurer if the new club member terminates their membership for one of the covered reasons. If the new club member leaves because of geographical relocation, then a portion of the initiation fee is paid back to the club for the benefit of the resigning member on a sliding scale for a selected number of years. If the club member terminates membership due to death, then the entire insurance benefit is paid to the beneficiary. In an alternative embodiment, if the beneficiary is a spouse, the club membership for the beneficiary is paid by the insurance proceeds for the life of the spouse. Insurance policies for periodic dues payments and assessments are initiated and paid out to the beneficiaries based upon terms similar to those described above for initiation fees.

In the exemplary embodiment, if the resigning club member leaves for geographical relocation, the club, for the benefit of the resigning member, is entitled to 80% of the initiation fee if the member resigns during the second year of membership, 70% of the initiation fee if the member resigns during the third year of membership, 60% of the initiation fee if the member resigns during the fourth year of membership, and 50% of the initiation fee if the member resigns during the fifth year of membership. The club receives no insurance benefit if the resigning member resigns after the end of the fifth year. Of course it should be understood that the above is exemplary only and is not to be considered limiting in any manner. The benefits could be structured in a number of ways such as having the term of insurance benefit extend beyond 5 years, having different amounts paid out, having the benefit cover the first year of membership, and having a waiting period more or less than one year for any or all of initiation fees, dues, and assessments.

FIG. 1 is a flow chart illustrating process steps for providing insurance coverage to a club for membership initiation fees. A user logs 10 into the system and is prompted, via a display that prompts the user for inputs, to enter 12 information relating to a named insured. The user is also prompted to enter 14 information regarding an insured club. Further, the user is prompted to enter 16 information regarding a new member. The system then processes 18 the input information, completes 20 the application, and prompts 22 the insurer to approve or reject the benefit. If the benefit is approved, the new member is added 24 to a benefits payable list and an insurance policy is entered into between the insurer and the club. Insurance coverage for periodic dues and one time assessments are provided utilizing the same processes as described above for initiation fees.

Figure 3:
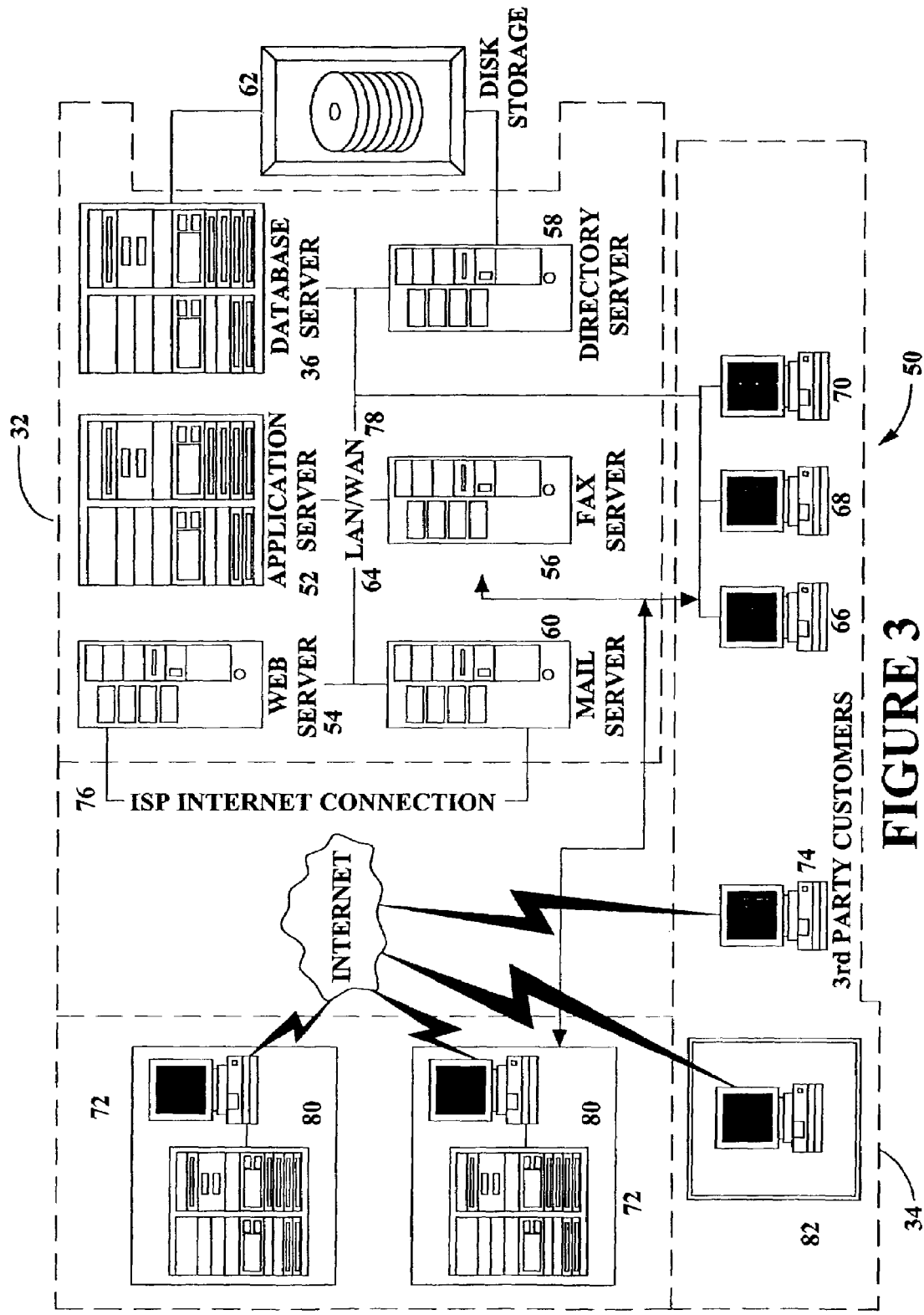
FIG. 3 is a block diagram of a server architecture for a network based system.
Figure 4:
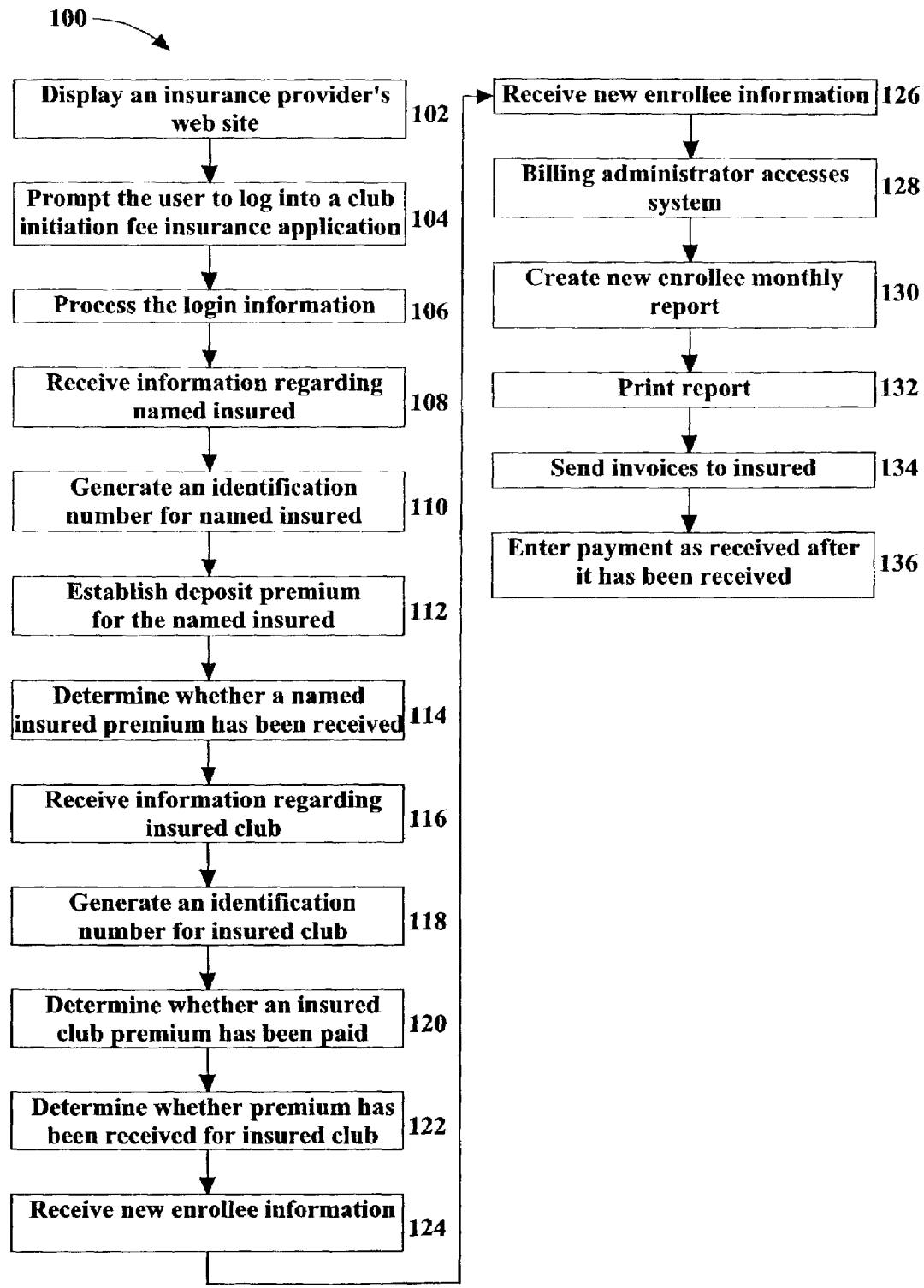
FIG. 4 is a flow chart illustrating process steps for providing insurance to clubs for club memberships.

Set forth below are details regarding exemplary hardware architectures (FIGS. 2 and 3) and an exemplary process flow chart illustrating information processing performed by the system (FIG. 4).

Figure 2:
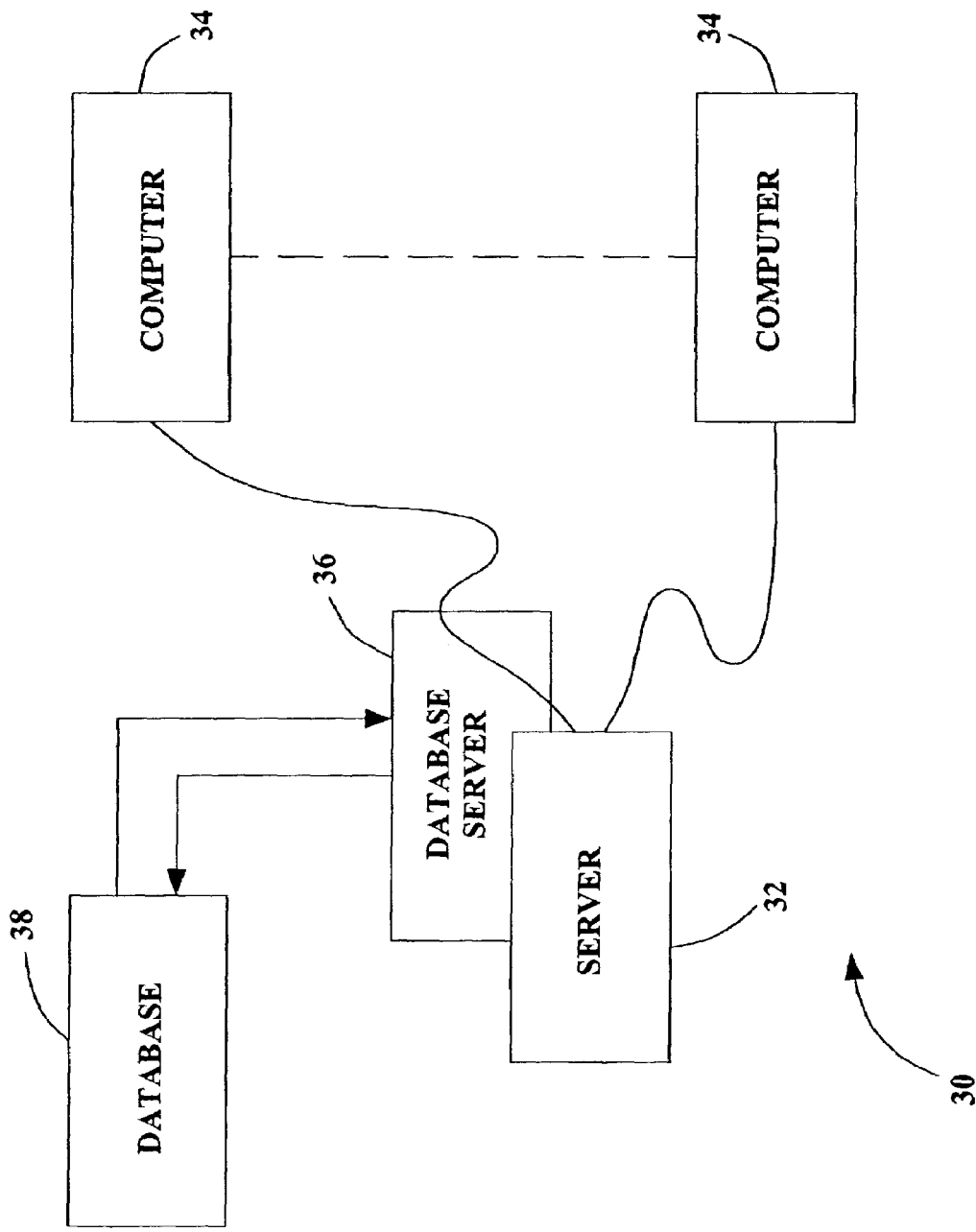
FIG. 2 is a simplified block diagram of a system in accordance with one embodiment of the invention.

FIG. 2 is a block diagram of a system 30 that includes a server sub-system 32, sometimes referred to herein as server 32, and a plurality of user devices 34 connected to server 32. In one embodiment, devices 34 are computers including a web browser, and server 32 is accessible to devices 34 via a network such as an intranet or a wide area network such as the Internet. In an alternative embodiment, devices 34 are servers for a network of customer devices.

Devices 34 are interconnected to the network, such as a local area network (LAN) or a wide area network (WAN), through many interfaces including dial-in-connections, cable modems and high-speed lines. Alternatively, devices 34 are any device capable of interconnecting to a network including a web-based phone, pager or other web-based connectable equipment. Server 32 includes a database server 36 connected to a centralized database 38. In one embodiment, centralized database 38 is stored on database server 36 and is accessed by users at one of customer devices 34 by logging onto server sub-system 32 through one of customer devices 34. In an alternative embodiment centralized database 38 is stored remotely from server 32.

FIG. 3 is a block diagram of a network based system 50 including server sub-system 32 and user devices 34. Server sub-system 32 includes database server 36, an application server 52, a web server 54, a fax server 56, a directory server 58, and a mail server 60. A disk storage unit 62 is coupled to database server 36 and directory server 58. Servers 36, 52, 54, 56, 58, and 60 are coupled in a local area network (LAN) 64. In addition, a system administrator work station 66, a work station 68, and a supervisor work station 70 are coupled to LAN 64. Alternatively, work stations 66, 68, and 70 are coupled to LAN 64 via an Internet link or are connected through an intranet.

Each work station 66, 68, and 70 is a personal computer including a web browser. Although the functions performed at the work stations typically are illustrated as being performed at respective work stations 66, 68, and 70, such functions can be performed at one of many personal computers coupled to LAN 64. Work stations 66, 68, and 70 are illustrated as being associated with separate functions only to facilitate an understanding of the different types of functions that can be performed by individuals having access to LAN 64.

Server sub-system 32 is configured to be communicatively coupled to various individuals or employees 72 and to third parties, e.g., customers, 74 via an ISP Internet connection 76. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 78, local area network 64 could be used in place of WAN 78.

In the exemplary embodiment, any employee 72 or customer 74 having a work station can access server sub-system 32. One of customer devices 34 includes a work station 80 located at a remote location. The work stations are personal computers including a web browser. Also, the work stations are configured to communicate with server sub-system 32. Furthermore, fax server 56 communicates with employees 72 and customers 74 located outside the business entity and any of the remotely located customer systems, including a customer system 82 via a telephone link. Fax server 56 is configured to communicate with other work stations 66, 68, and 70 as well.

In one specific exemplary embodiment, the following commercially available hardware and software are utilized: Web Server platform Windows NT 4.0 SP 5; Database Server platform Windows NT 4.0; Internet Information Server (IIS) 4.0; Microsoft Transaction Server (MTS); COM objects using VB 6.0 dlls; Active Server Pages 3.0; JScript 5.0; VBScript 5.0; and SQL Database 7.0. The extranet site operates under Internet Explorer 4.0 or higher and Netscape 4.0 or higher.

FIG. 4 is a flow chart illustrating process steps of a method 100 for enrolling in a club membership initiation fee insurance program. The process steps of method 100 are similar to those that are utilized for enrolling in an insurance program for one or more of periodic dues and one-time assessments. A system displays 102 on a user terminal an insurance provider's web site. The system, similar to system 30 shown in FIG. 1, prompts 104 the user to log into a club initiation fee insurance application. The system processes 106 the login information and either accepts the user login and transmits an application page to the user terminal, or rejects the user login and transmits the insurance provider's web site to the user terminal. In one embodiment, the user is an insurance broker administrator.

The system receives 116 information about an insured club from the named insured and stores the received information in an insured club database. The system reviews the received information and determines whether the information is complete and can be accepted or is incomplete and needs to have additional information for processing. Once the information is complete, the system generates 118 an identification number for the insured club. A deposit premium is established 120 at this level if a policy is written against the club and the system determines 122 whether a premium has yet been received for the insured club. If a premium has been received, the financials are updated and the accounts payable is credited the deposit premium. If a premium has not yet been received, no financial transactions take place and an invoice is sent to the insured club.

A billing administrator accesses 128 the system and creates 130 a new member's monthly report. The report is printed 132 and invoices are sent 134 to the insured. Once payment is received, the payment is indicated 136 as being received, the application is updated, and the payment is sent to the insurer.

Figure 5:
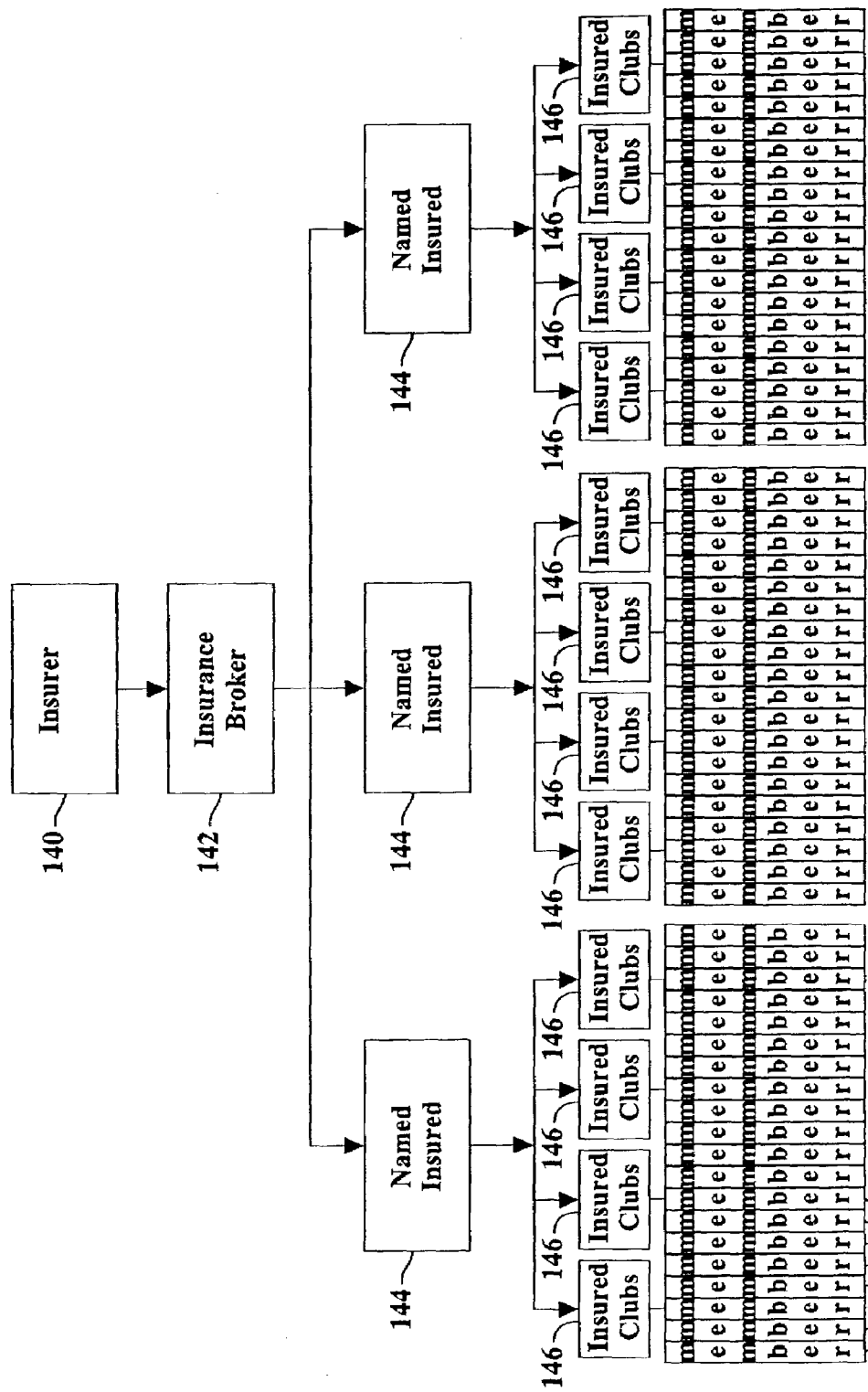
FIG. 5 is a block diagram that represents the hierarchy of the business structure utilized to provide the insurance for the club membership initiation fees.

FIG. 5 is a block diagram that represents the hierarchy of one embodiment of a business structure utilized to provide insurance for the club membership initiation fees, dues, and assessments. An insurer 140 offers a product through an insurance broker 142 to at least one named insured 144. Each named insured 144 offers the product to at least one insured club 146 which have a plurality of club members 148.

FIG. 6 is a matrix detailing the access each business entity described in FIG. 5 has to the various pages in the web site. Users access a web site and enter a user id and a password as described below in detail. Security is enforced by controlling the access each user has to each of the various web site pages. The "X"s in the matrix shown in FIG. 6 depict an exemplary set of roles and portions of the site to which the respective user has read/write access to designated areas of the site.

Figure 7:
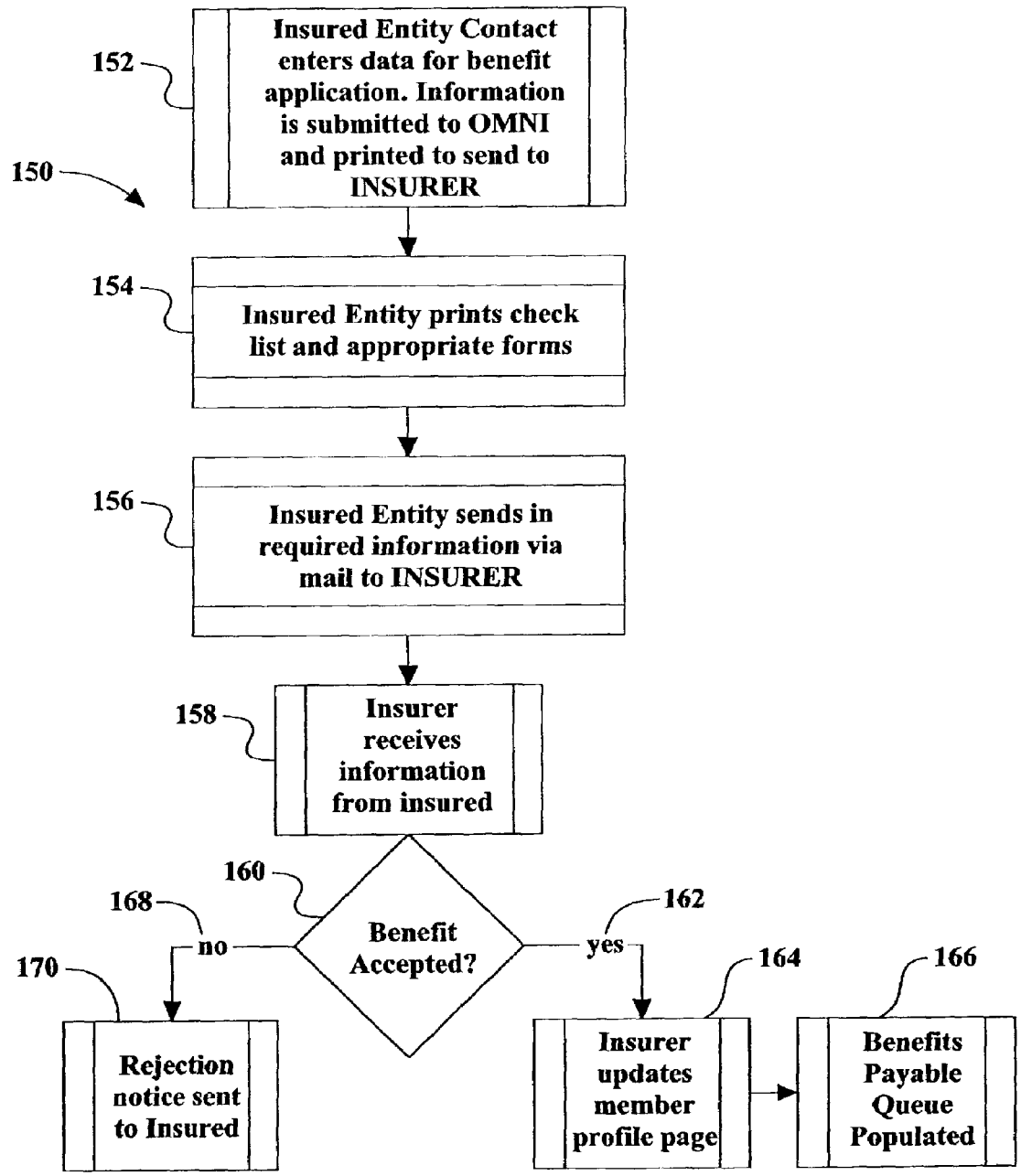
FIG. 7 is a method for processing claims related to a club membership initiation fee insurance program.

FIG. 7 is a method 150 for processing claims related to a club membership initiation fee insurance program. Methods similar to method 150 are utilized for processing claims related to periodic dues and one-time assessments insurance programs. In addition, similar methods are utilized which allow a club member to finance one or more of their initiation fees, dues, assessments, and the insurance premiums for initiation fee, dues, and assessment insurance. Referring specifically to FIG. 7, an insured entity contact enters 152 data for benefit application and the information is submitted to an insurance broker. The insured entity sends the information to the insurer. The insured entity obtains 154 the proper check list and the appropriate forms. The insured entity then sends 156 the required information to the insurer. Once the insurer receives 158 the pertinent information from the insured, a decision is made 160 regarding whether to accept the benefit. If the benefit is accepted 162, the insurer updates 164 the member profile page and the benefits payable queue is populated 166. If the benefit is not accepted 168, a rejection notice is sent 170 to the insured detailing the reasons why the benefit has been rejected.

In an exemplary embodiment, there are certain rules and actions that are followed by the system and the interested parties. The following is a description of some of these rules and actions that apply in the exemplary embodiment. The system generates the named insured identification numbers, the insured club identification numbers, and the member identification numbers. If the premium is less than or equal to $2,000 and the initiation fee is to be paid in full up front, full payment for the premium is due to the insurance broker. Clubs that do not make payments in full as described above will not be eligible for member's coverage.

If the initiation fee payment is staggered, payment of the insurance benefit is also staggered. For example, if the member pays 50% of the initiation fee the first year, 25% of the initiation fee the second year, and 25% of the initiation fee the third year, the payment of the insurance benefit is pro-rated depending on the percentage of the initiation fee paid by the member up to the time of resignation. Benefit checks will be issued and mailed to the insured. Benefits will be paid within 60 days of receiving all required documentation, and benefit payments will not offset account receivables. Benefit processing will occur outside the application. Benefits will be paid based on the resignation date or the move date, whichever is later. In an exemplary embodiment, payment of the benefits is: Year One 0%, Year 2 80% of the paid initiation fee returned, Year three 70% of the paid initiation fee returned, Year four 60% of the paid initiation fee returned, and Year five 50% of the paid initiation fee returned. The above description is exemplary only and is not meant to be limiting, and such staggered premium payments and benefit payments are applicable to dues and assessment insurance programs.

To implement the processes described above, many variations of particular screens viewable by a customer can be utilized. The following description refers to one set of screens that can be used to prompt a customer to make the necessary inputs to enable the system to process the insurance related information. Of course, many variations of such screens are possible.

Figure 8:
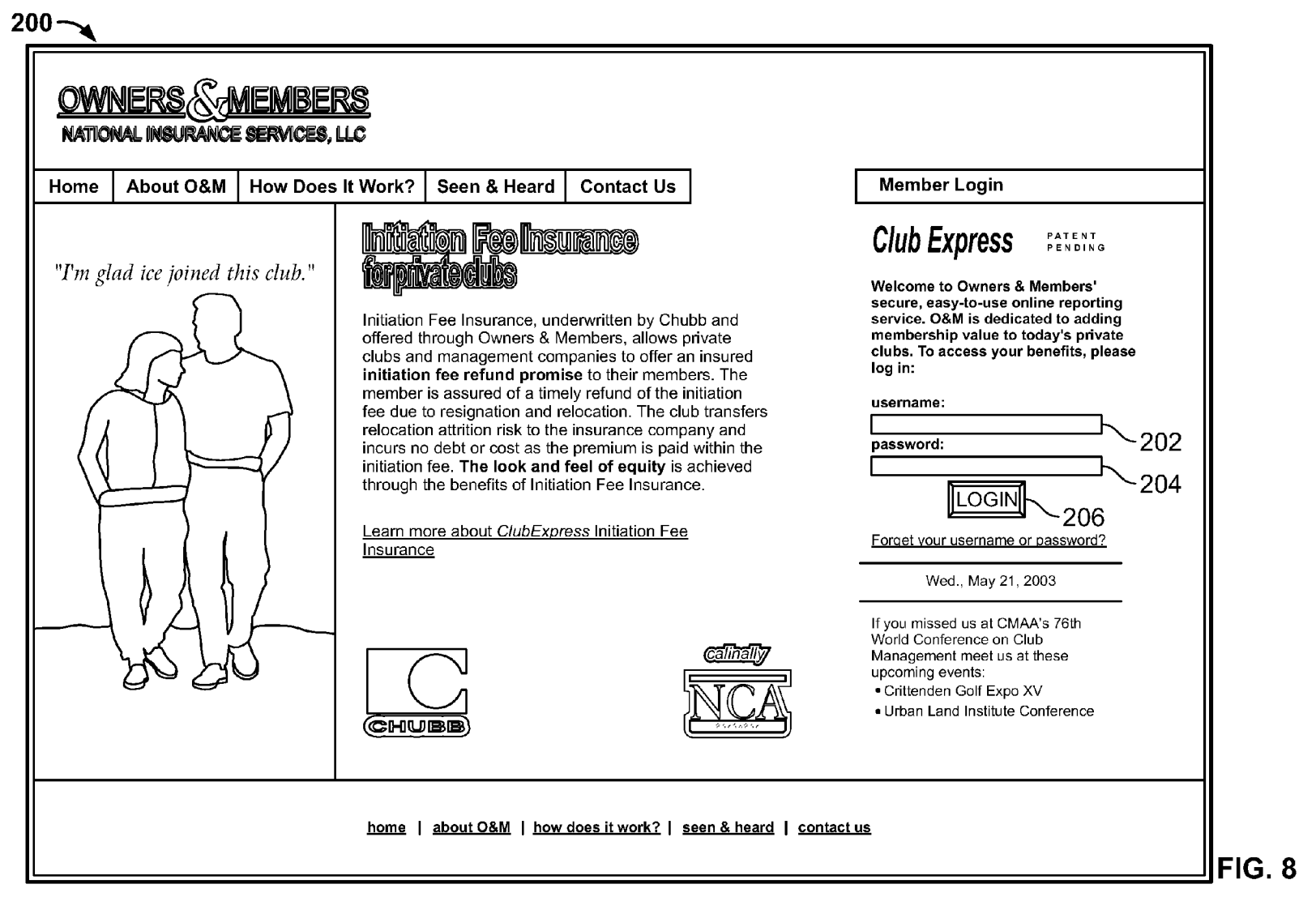
Figure 22:
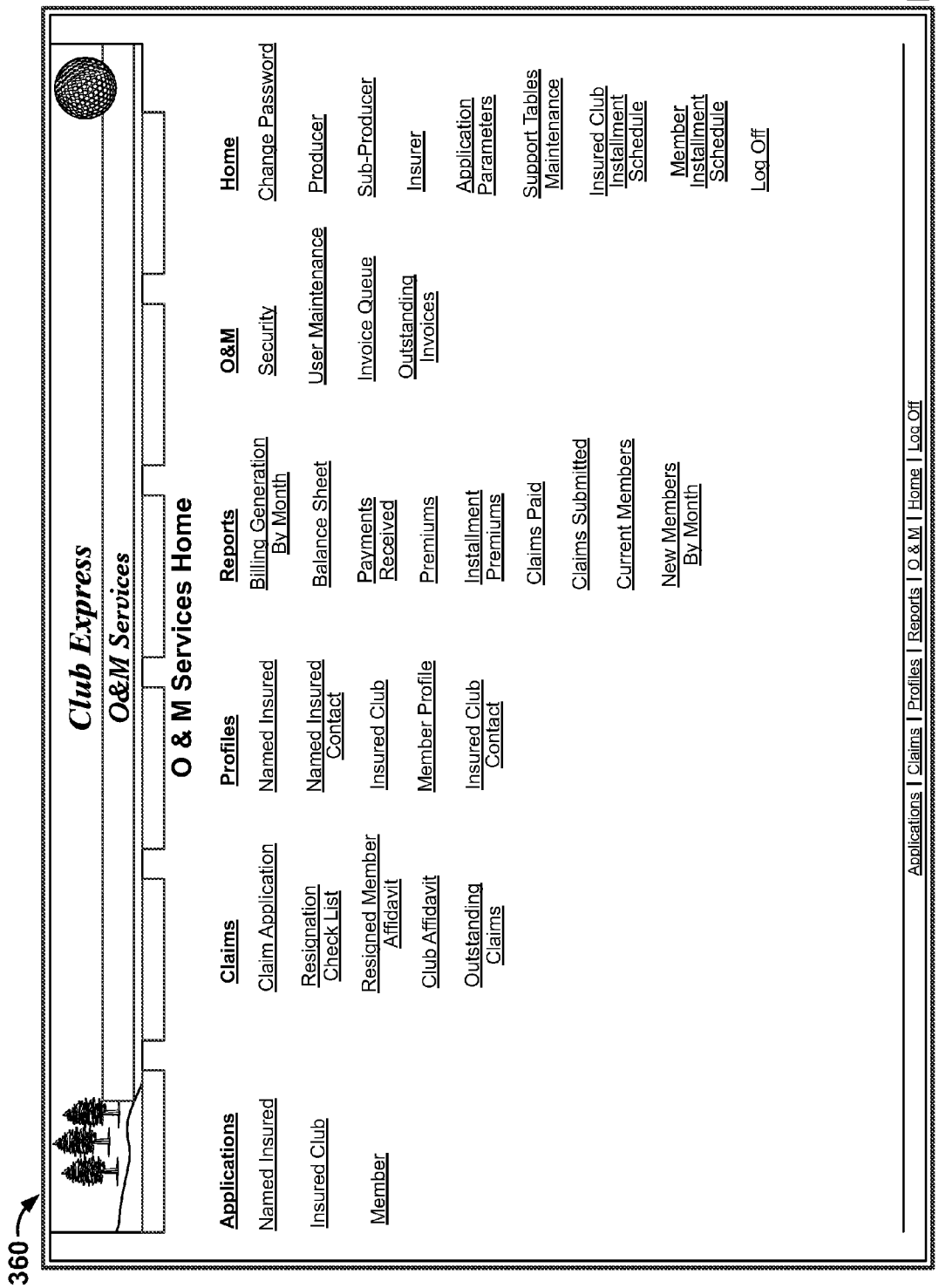
FIG. 22 is an exemplary embodiment of an insurance broker home page.

FIG. 8 shows an exemplary embodiment of an insurance broker web site login page, as depicted in screen shot 200, which a system, such as system 30 (shown in FIG. 2), displays to a user device, such as user device 34 (shown in FIG. 2). Screen shot 200 includes information blocks for a user name 202 and password 204. In use, a user enters the requested information (i.e. user name 202 and password 204) and selects a login button 206 to transmit the information to the system. If the information submitted by the user is not accepted by system 30, system 30 clears the information blocks and retransmits the insurance broker's web site login page to user device 34. If a correct user name 202 and password 204 are entered, system 30 causes an insurance broker's home page to be displayed, an exemplary embodiment of which is shown in FIG. 22.

FIG. 9 shows an exemplary embodiment of a named insured application page depicted as screen shot 210. Screen shot 210 is transmitted to user device 34 (show in FIG. 2) if the information submitted by the user on login page 200 is accepted by system 30. Named insured page 210 includes a number of information blocks 212 to be completed by an insurance broker administrator. In addition, screen shot 210 includes a new button 214 to transmit the inputted information to system 30, and reset page 210 so that information blocks 212 can be entered for another named insured. After the information is submitted by the insurance broker administrator, system 30 either approves or disapproves the application. If the application is approved, system 30 generates an ID number and a deposit premium is established. If the premium has been received, the financials are updated and if the premium has not been received, an invoice is sent out.

FIG. 10 shows an exemplary embodiment of a club application page depicted as screen shot 220. Club application screen shot 220 includes a number of information blocks 222 to be completed by a named insured. Alternatively, an insurance broker completes the information requested on screen shot 220. In addition, screen shot 220 includes a new button 224 to transmit the inputted information to system 30 and which also clears any information entered into information blocks 222, for entry of data for another club. After the information is submitted by the named insured, system 30 either approves or disapproves the application. If the application is approved, system 30 generates an ID number and a deposit premium is established. If the premium has been received, the financials are updated and if the premium has not been received, an invoice is sent out.

Figure 11:
FIG. 11 is an exemplary embodiment of a member application page.

FIG. 11 shows an exemplary embodiment of a member application page depicted as screen shot 230. Member application screen shot 230 includes a number of information blocks 232 to be completed by an insured entity. In addition, screen shot 230 includes an add button 234 to transmit the inputted information to system 30 and clear information blocks 232 so that another member application can be input. Screen shot 230 also includes a reset form button 236 to clear any information entered into information blocks 232. After the information is submitted by the insured entity, system 30 either approves or disapproves the application. If the application is approved, system 30 generates an ID number and an invoice number is queued up for billing purposes.

Figure 12:
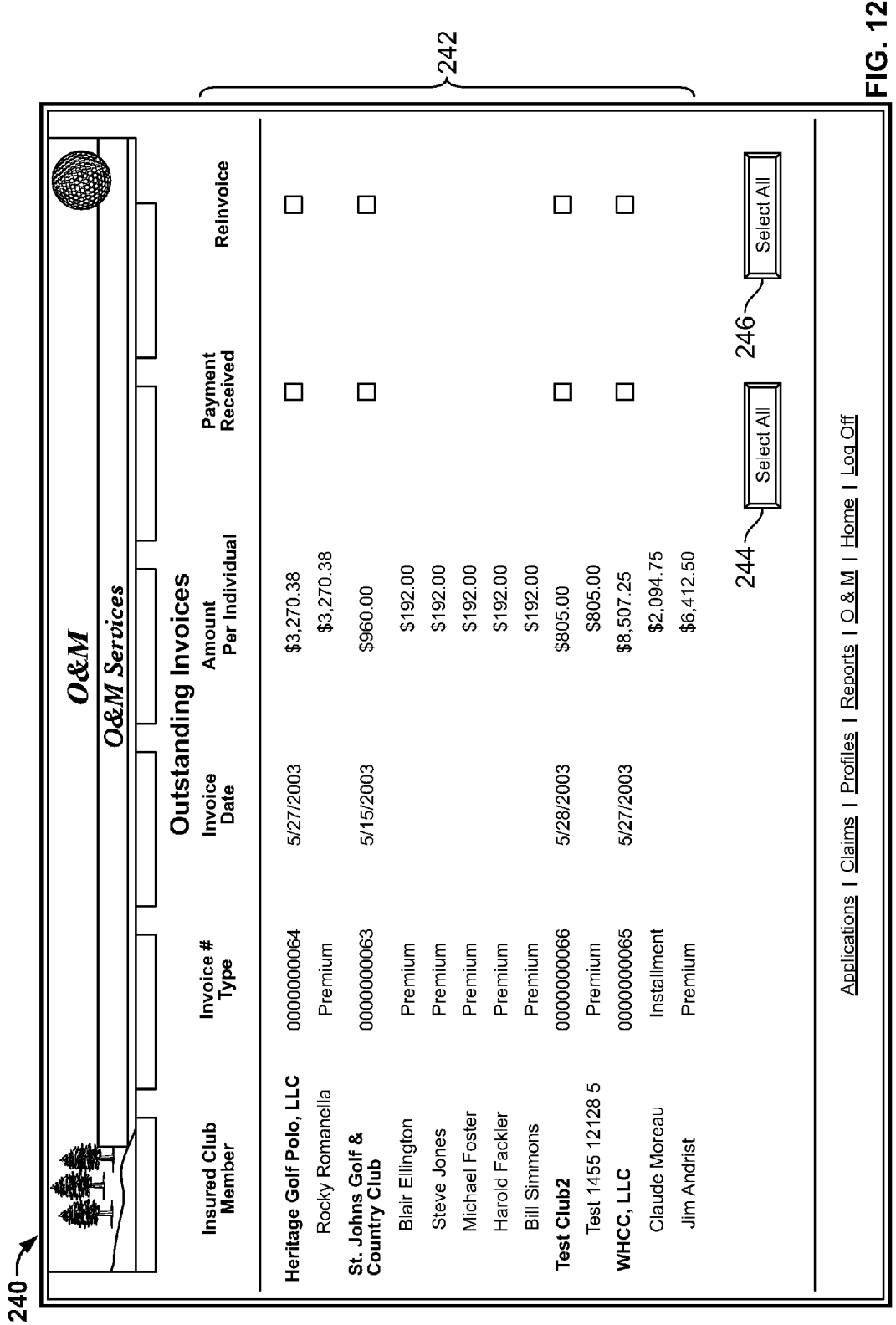
FIG. 12 is an exemplary embodiment of an outstanding invoices page.

FIG. 12 shows an exemplary embodiment of an outstanding invoices page depicted as screen shot 240. Outstanding invoices screen shot 240 includes a number of member entries 242 that lists the members, the insured club, the amount due, the invoice date, and the payment received. In addition, screen shot 240 includes a select all button 244 to indicate that payments have been received from all of the insured club members and a select all button 246 which causes all insured club members to be re-invoiced. In one embodiment, screen shot 240 also includes a clear form button (not shown) to clear any information entered into information blocks 242. A billing administrator determines the number of new members that have been added for a selected period of time. System 30 (shown in FIG. 2) is used to create an invoice and the billing administrator sends the invoice to the insured once each preselected period. A collection administrator determines when payment is received and marks a box on each member entry line. Once payment is received, the application is updated and the payment is sent to the insurer.

Figure 13:
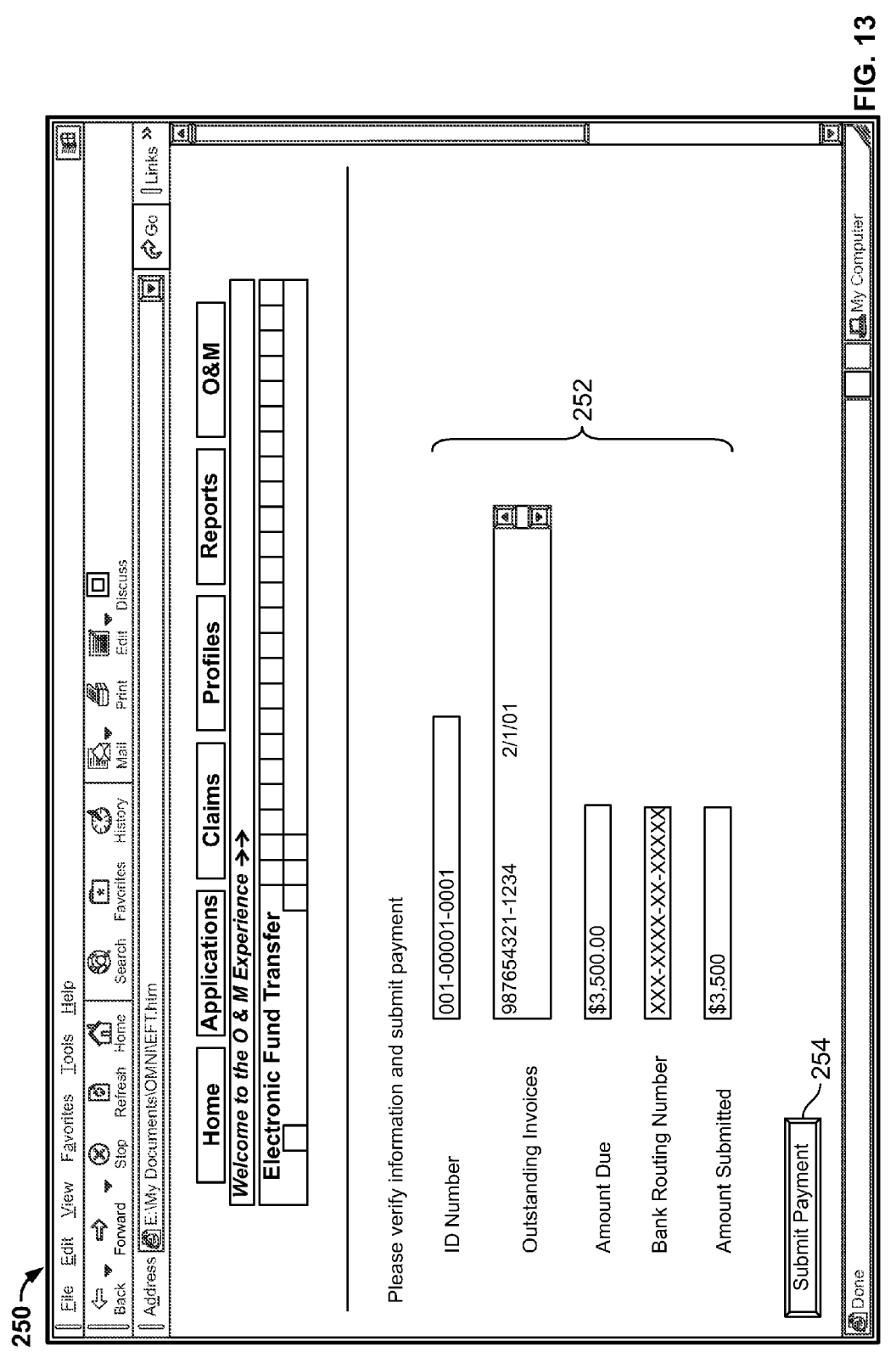

FIG. 13 shows an exemplary embodiment of an electronic fund transfer page depicted as screen shot 250. Screen shot 250 includes a number of information blocks 252 pertaining to payment specific information to be completed by the insured entity. In addition, screen shot 250 includes a submit payment button 254 to transmit the inputted information to system 30 (shown in FIG. 2). In one embodiment, screen shot 250 also includes a clear form button (not shown) to clear any information entered into information blocks 252. After the information is submitted by the insured entity, system 30 either accepts or rejects the application. If the information is accepted, system 30 updates outstanding invoice page (shown in screen shot 240) and the financial transactions take place.

FIG. 14 is an exemplary embodiment of a Claim Application page depicted in screen shot 260. Screen shot 260 includes a number of information blocks 262 pertaining to benefit specific information to be completed by the club. In one embodiment, screen shot 260 includes a submit button (not shown) to transmit the inputted information to system 30 (shown in FIG. 2). In another embodiment, screen shot 260 also includes a clear form button (not shown) to clear any information entered into information blocks 262. The insured prints the benefit form and sends the form to the insurer. In one embodiment, other required claims documents are also sent to the insurer. A notification of this transmission is sent to the insurance broker. The insurer reviews the documents and either accepts or rejects the benefit. If the benefit is accepted, system 30 updates the member information on the member information page, depicted in FIG. 9. The member is then entered into a benefits payable queue. If the benefit is rejected, a rejection letter is sent to the insured detailing reasons why the insured rejected the benefit.

FIG. 15 is an exemplary embodiment of an outstanding claims page depicted in screen shot 270. Screen shot 270 includes a number of information blocks 272 utilized to determine whether a benefit has been sent to a member. Screen shot 270 also includes an update button 274 to transmit the inputted information to system 30 (shown in FIG. 2). In one embodiment, screen shot 270 includes a reset button 276 to clear any information entered into information blocks 272. After the information is submitted with a payment sent box checked, system 30 is updated with the proper information.

FIG. 16 is an exemplary embodiment of a named insured profile page depicted in screen shot 280. Screen shot 280 includes a number of information blocks 282 utilized to document the named insured. The named insured profile information is entered and maintained in a database by Administrators or account managers. Screen shot 280 also includes a new button 284 which causes the inputted information to be transmitted to system 30 (shown in FIG. 2) and clear information blocks 282 for entry of another profile. A delete button 285 allows a user to delete a selected profile from system 30. Screen shot 280 also includes a comment box 286 used to provide comments and notes regarding the named insured profile information. Screen shot 280 is utilized in one embodiment to edit a named insured profile page that has previously been completed and sent to system 30 (shown in FIG. 2).

FIG. 17 is an exemplary embodiment of a named insured contact profile page depicted in screen shot 290. Screen shot 290 includes a number of information blocks 292 utilized to document the named insured contact. The named insured contact information is entered and maintained in a database by Administrators or account managers. Screen shot 290 also includes a new button 294 which causes entered information to be transmitted to system 30 (shown in FIG. 2) and further clear information entered into information blocks 292 for entry of information of another insured contact. Screen shot 290 further includes a comment box 298 used to provide comments and notes regarding the named insured contact. Screen shot 290 is utilized to edit named insured contact details that have previously been completed and sent to system 30 (shown in FIG. 2).

FIG. 18 is an exemplary embodiment of an insured club profile page depicted in screen shot 310. Screen shot 310 includes a number of information blocks 312 utilized to document the insured club detail. The insured club detail information is entered and maintained in a database by Administrators or account managers. Entry of data into the profile page depicted by screen shot 310 initiates transmission of the inputted information to system 30 (shown in FIG. 2). Screen shot 310 further includes a comment box 316 used to provide comments and notes regarding the insured club detail. In one embodiment, profile page is utilized to edit a named insured detail page that has previously been completed and sent to system 30 (shown in FIG. 2).

FIG. 19 is an exemplary embodiment of a club contact profile page depicted in screen shot 320. Screen shot 320 includes a number of information blocks 322 utilized to document the named insured club contact. The named insured club contact information is entered and maintained in a database by Administrators or account managers. Screen shot 320 also includes a new button 324 which causes the entered contact information to be transmitted to system 30 (shown in FIG. 2), and further causes any information entered into information blocks 322 to be cleared allowing the entry of information for a new insured club contact. Screen shot 320 further includes a comment box 328 used to provide comments and notes regarding the insured club contact detail. Screen shot 320 is utilized to edit an insured club contact detail page that has previously been completed and sent to system 30 (shown in FIG. 2).

Figure 20:
FIG. 20 is an exemplary embodiment of a member profile page.

FIG. 20 is an exemplary embodiment of a member profile page depicted in screen shot 340. Screen shot 340 includes a number of information blocks 342 utilized to document the member profile. The member profile information is entered and maintained in a database by Administrators or account managers. Screen shot 340 allows the inputted information to be transmitted to system 30 (shown in FIG. 2). In an embodiment not shown, member profile page includes a clear form button to clear any information entered into information blocks 342. Screen shot 340 also includes a comment box 348 used to provide comments and notes regarding the member detail. Screen shot 340 is utilized to enter new member profiles and to edit an member profile page that has previously been completed and sent to system 30 (shown in FIG. 2).

FIG. 21 is an exemplary embodiment of a benefits submitted page depicted in screen shot 350. Screen shot 350 includes a number of member listings 352 that include information regarding benefits submitted for the particular member. Screen shot 350 also includes a submit button 354 that is utilized to submit the inputted information to system 30 (shown in FIG. 2).

Other screen shots are incorporated into system 30 (shown in FIG. 2) to allow tracking of club and club member initiation fees, dues, and assessments. FIG. 22 is an exemplary embodiment of a home page screen shot 360 which is displayed upon entry of a valid user name 202 and password 202, as described above in relation to FIG. 8. Selections of pages from home page screen shot 360 are grouped according to functions under headings of applications, claims, profiles, reports, O&M (administrative), and home.

Some of the functions are described above with respect to FIGS. 9-21. In one embodiment, a complete listing of heading follows: Under the heading applications, application for each of a named insured, insured club, and member can be selected. Under claims, one or more of a claim application, a resignation check list, a resigned member affidavit, a club affidavit, and outstanding claims can be selected and displayed by system 30. Under a profiles heading, profiles for each of a named insured, a named insured contact, an insured club, a member profile, and an insured club contact can be selected. Under a reports heading, reports for billing generation by month, a balance sheet, payments received, premiums, installment premiums, claims paid, claims submitted, current members, and new members by months are available.

An administrative heading is provided to allow a user to access such functions as security, user maintenance, an invoice queue, and outstanding invoices are selectable. Under a home heading, functions such as change password, producer, sub-producer, insurer, application parameters, support table maintenance, an insured club installment schedule, a member installment schedule and a log off option are provide.

Other screens (not shown) are utilized which allow a club member to apply for financing of one or more of their initiation fees, dues, and assessments, in addition to the financing of the insurance premiums.

The above described embodiments provide systems and methods for insuring initiation fees for entities and members of such entities, for example, clubs. As also described above, other transactions also typically take place between clubs and their members. One such transaction is dues, for example, annual or monthly dues. Such dues are typically payable by members of a club and are utilized to provide day-to-day operating costs for such clubs. Another transaction type is an assessment, payable by members to the club. An assessment differs from an initiation fee or dues payment in that an assessment is a special, and sometimes unexpected, one-time payment to the club by the members. Examples of situations where an assessment might be warranted by a club includes, but is not limited to, budgetary shortfalls, additions to a club (e.g. construction costs), catastrophic events, etc.

The above described methods and systems, along with the above described databases therein, are also contemplated to provide insurance for such dues and assessments. In addition, embodiments of the above described systems exist which allow a club member to finance one or more of their initiation fees, dues, and assessments, in addition to the financing of the insurance premiums for such initiation fee, dues, and assessment insurance.

While the invention has been described in terms of various specific embodiments, those skilled in the art will recognize that the invention can be practiced with modification within the spirit and scope of the claims.

While the invention has been described in terms of various specific embodiments, those skilled in the art will recognize that the invention can be practiced with modification within the spirit and scope of the claims.

What is claimed is:

1. A system for implementing an insurance program by an insurer to protect a club from a loss of at least one of initiation fees, dues, and assessments paid by a member to the club, said system comprising:
    a club database; and
    a server configured to:
        prompt a user associated with the club to input information to the insurer regarding the club including information pertaining to at least one of initiation fees, dues, and assessments paid by the member for membership with the club;
        receive and process the input information;
        based on the input information, indicate that the insurer is to enter into an insurance policy with the club;
        receive a notification from the club of a resignation of membership with the club by the member; and
        generate an insurance benefit payment to the club, wherein the insurance benefit payment includes at least a portion of the at least one of initiation fees, dues, and assessments paid by the member to the club, in response to notification of the resignation of the member from the club.

2. A system in accordance with claim 1, further comprising a club member database.

3. A system in accordance with claim 1, further comprising a benefits payable database.

4. A system for implementing an insurance program by an insurer to protect a club from a loss of club initiation fees, dues, and assessments paid by a club member to the club, said system comprising:
    at least one user device; and
    a server connected to said at least one user device, said server configured to:
        receive, via said at least one user device, information pertaining to an insurance application for at least one of an initiation fee insurance program, a dues insurance program, and an assessment insurance program provided by an insurer to the club;
        process the received information;
        transmit information to said at least one user device an approval of the insurance application by the insurer, wherein the insurance programs insure the club for a loss of at least a portion of at least one of the initiation fees, dues, and assessments paid to the club by the club member;
        receive a notification from the club of a resignation of membership with the club by the club member; and
        generate an insurance benefit payment to the club according to the respective insurance program, wherein the insurance benefit payment includes at least a portion of the initiation fees, dues, or assessments paid by the member to the club, in response to notification of the resignation of the member from the club.

5. A system in accordance with claim 4, wherein said server configured to receive, via said at least one user device, information pertaining to at least one of a club initiation fee insurance program, a dues insurance program, and an assessment insurance program.

6. A system in accordance with claim 4, wherein said server further configured to determine whether to approve one or more of the initiation fee, dues, and assessment insurance applications.

7. A system in accordance with claim 4, wherein said server configured to receive, via said at least one user device, information pertaining to financing of at least one of the initiation fee insurance program, the dues insurance program, the assessment insurance program, and insurance premiums for the insurance programs.

8. A system in accordance with claim 4, wherein said server further configured to determine whether the insurer is to approve financing of one or more of the initiation fee, dues, and assessment insurance applications, and financing for the insurance applications.

9. A system in accordance with claim 4, wherein said server further configured to receive information pertaining to a named insured, an insured club, and a club member.

10. A system in accordance with claim 9, wherein said server further configured to:
    generate an identification for the named insured; and
    generate an identification number for the insured club.

11. A system in accordance with claim 4, wherein said server further configured to establish a deposit premium for a named insured.

12. A system in accordance with claim 4, wherein said server further configured to authorize an initiation fee insurance benefit to be paid by the insurer to the club, wherein the initiation fee insurance benefit covers at least a portion of an initiation fee paid by the club member upon the loss of the at least a portion of the initiation fee by the club.

13. A system in accordance with claim 4, wherein said server further configured to:
    reject an initiation fee insurance benefit; and
    send a rejection notice to the club.

14. A method for implementing a club membership initiation fee, dues, and assessment insurance program provided by an insurer to a club, said method comprising:
    prompting a representative of the club to input information using a user device, the information relating to an insurance application for at least one of a club initiation fee, club dues, and club assessments to be paid by a member to the club;
    receiving, by a server, the information input by the user into the user device;
    processing the input information using the server
    indicating, by the server, that the insurer is to issue an insurance policy to the insured insuring against a loss of at least a portion of at least one of the initiation fees, dues, and assessments paid by the member to the club; and
    generating, by the server, a benefit payment paid by the insurer to the club upon a loss of the at least a portion of at least one of the initiation fees, dues, and assessments in response to notification of a resignation of the member from the club.

15. A method in accordance with claim 14, wherein said step of receiving information comprises the step of receiving information about the insured club.

16. A method in accordance with claim 14, wherein said step of receiving information comprises the step of receiving information about the member.

17. A system for implementing an insurance program by an insurer for at least one of initiation fees, dues, and assessments paid by a member to a club, said system comprising:
- a club database; and
- a server configured to:
  - prompt a user associated with the club to input information to the insurer regarding the club including information pertaining to at least one of initiation fees, dues, and assessments paid by the member for membership with the club;
  - receive and process the input information to determine whether the insurer is to enter into an insurance policy with the club;
  - issue an insurance policy with the club responsive to a determination that the insurer should enter into the insurance policy with the club;
  - receive a notification from the club of a resignation of membership with the club by the member; and
  - generate an insurance benefit payment to the club, wherein the insurance benefit payment includes at least a portion of the at least one of initiation fees, dues, and assessments paid by the member to the club, in response to notification of the resignation of the member from the club.

* * * * *